Jan. 16, 1934.  A. HUDSON  1,943,673
FILM DISPLAY FRAME FOR PROJECTORS
Filed June 22, 1932
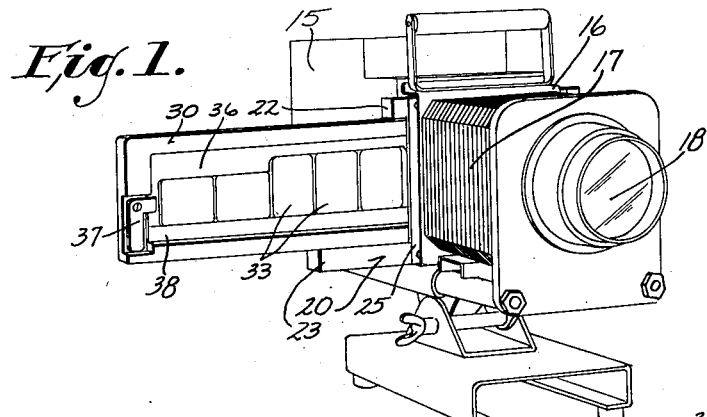
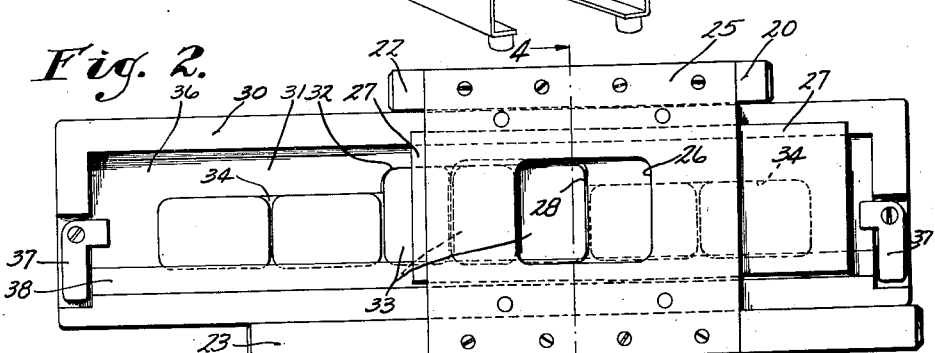
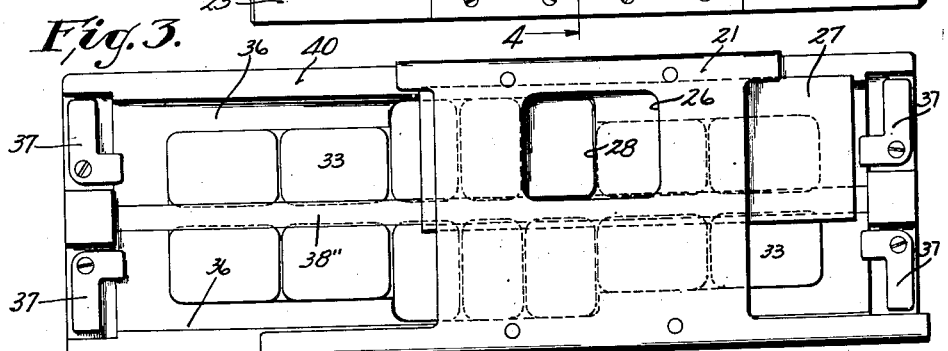
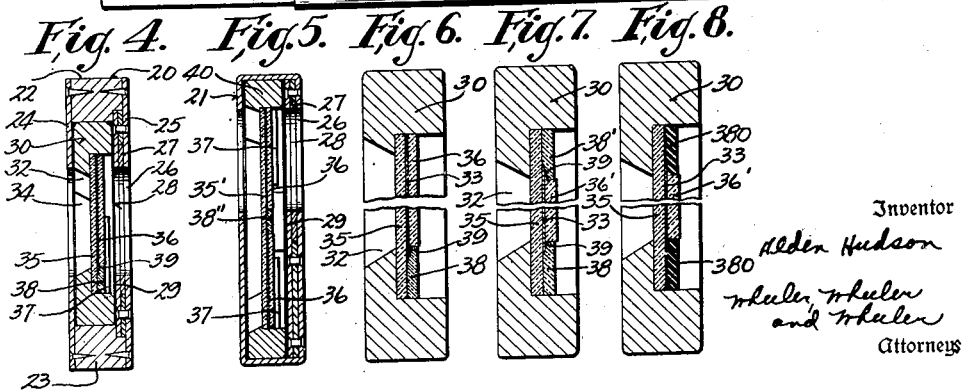
Inventor
Alden Hudson
Wheeler, Wheeler
and Wheeler
Attorneys Patented Jan. 16, 1934

1,943,673

UNITED STATES PATENT OFFICE 1,943,673

FILM DISPLAY FRAME FOR PROJECTORS

Alden Hudson, Green Bay, Wis.

Application June 22, 1932. Serial No. 618,585

17 Claims. (Cl. 88—26)

This invention relates to improvements in film display frames for projectors.

It is the primary object of the invention to provide a novel and simple means specifically adapted for the mounting and framing of dental X-ray films to facilitate the projection of the images of successive teeth in proper sequence, and further to make it possible for the operator to restrict the field of projected vision to a single tooth or a part of a single tooth in order that attention of the audience may be focused upon the particular subject matter under discussion.

It is my further object to adapt the invention to use in standard projecting apparatus and to devise means whereby films showing both upper and lower sets of teeth arranged in proper sequence may be mounted in a single frame whereby the projected image of any tooth of either set may conveniently be made available through mere adjustment of the frame with respect to the projector.

In the drawing:

Figure 1 is a perspective view of conventional projecting apparatus equipped with a frame and frame mounting made in accordance with this invention.

Figure 2 is an enlarged detail view of the frame and frame mounting as they appear in front elevation.

Figure 3 is a view similar to Figure 2 showing a modified embodiment of the invention including a duplex frame for handling two sets of negatives simultaneously.

Figure 4 is a detail taken in cross section in the plane indicated at 4—4 in Fig. 2.

Figure 5 is a detail in cross section in a similar plane through the modified embodiment shown in Figure 3.

Figure 6 is an enlarged detail in cross section through the film mounting portion of the frame.

Figure 7 is a view similar to Figure 6 showing a modified film mounting arrangement.

Figure 8 is a view similar to Figures 6 and 7 showing a further modified embodiment of the invention.

Like parts are identified by the same reference characters throughout the several views.

The conventional projector pictured in Fig. 1 includes a lamp casing 15, a slide receiving fixture 16, a focusing bellows 17 and a lens 18, the whole being assembled on a suitable frame.

For the purposes of the present invention the slide holder customarily used in projectors of this sort is replaced by a frame guide such as that shown at 20 in Figs. 1, 2 and 4, or that shown at 21 in Figs. 3 and 5.

The frame guide 20 comprises upper and lower bars 22 and 23 of sufficient length to provide adequate support for the slidable frame hereinafter to be described. These bars are connected by plates 24 and 25 applied to their rear and front faces respectively, the plates having registering apertures of sufficient dimensions to frame the area of the largest film required to be projected. Preferably, a shutter is employed to reduce the size of the aperture 26 in plate 25. The shutter may comprise a thin slidable plate 27 having an opening at 28 sufficiently large to register with opening 26 when required, the shutter 27 being slidably across opening 26 to reduce the horizontal extent of the effective opening as shown in Fig. 2. The shutter may conveniently be held to the front plate 25 by a correspondingly apertured retaining plate 29 as shown in Fig. 4.

The space between the rear plate 24 and the shutter plate assembly at the front of the frame guide is occupied by a slidable frame 30 of special construction. Frame 30 is specifically adapted for the display of X-ray films in their proper relative positions. Since it is undesirable to have the direct light of the projector reach the screen, the openings in frame 30 are just sufficiently large to outline the negatives used. Thus, independently of plate 25 and the shutter control opening 26 thereof, the frame itself is designed to exclude quite largely all undesired light from the screen.

Frame 30 includes an opaque panel 31 which serves as a mask. The opening therein includes a relatively high central opening at 32 of just sufficient dimensions to receive the vertically disposed films 33 which are required for the proper illustration of the six teeth in the front central portion of the patient's jaw. The opening in the mask 31 is extended to each side at 34 with less height and greater proportionate length, being thereby adapted to take horizontally disposed films such as are commonly used for the teeth at the sides of the patient's jaw. Thus, it is possible to arrange in frame 30 in their proper sequence and proper relative positions, all of the negatives required to show a complete set of teeth as they appear in one of the patient's jaws. By moving the frame 30 from side to side in the frame guide 20, any one of the negatives may be registerable in opening 26, the shutter 27 being used where desired to limit the area of the opening to correspond to a single vertically disposed film or some lesser portion thereof.

All photographic films have a tendency to curl. This tendency is particularly noticeable when the device has been in use and its surfaces are heated. The arrangement of a number of films in the desired relative positions becomes a serious problem when the films will not lie flat. Under such circumstances it is extremely difficult to clamp them between the pair of glasses ordinarily used in film holders. To overcome this difficulty a special film holding device is employed in the frame herein disclosed.

It has been found that glass or some equivalent transparent material of substantial mass is almost essential to the operation of the device in order to prevent the heat from destroying the film. The film will blister and be destroyed by the heat unless the mass of the transparent mounting plate is sufficient to carry away the heat as it is developed.

The glass shown at 35 is merely a conventional piece of clear glass fitted into the customary recess in the frame. The cover glass 36, which is held in place by the adjustably pivoted clamps 37, differs from conventional practice in that it is materially narrower than glass 35 and covers only that portion of glass 35 which is exposed through the openings 32 and 34. Beneath the cover glass 36 is a narrow detent strip 38 (Fig. 6) which is preferably cemented to glass 35 along the lower margin thereof as has its upper marginal portion beveled at 39 along its inner face to provide a wedge-shaped pocket into which the lower margin of each of the several films is receivable. Fig. 6 illustrates in detail how the film 33 has its lower marginal portion introduced into this pocket. The edge of a film so inserted into the pocket produced by the beveling of strip 38 will be frictionally retained notwithstanding any curling of the film, so that when a film is once positioned the operator may disregard it in handling films subsequently to be positioned in the holder. When the cover glass is ultimately applied, all of the films will be pressed flat in their proper reative locations. The structure disclosed engages so small a marginal portion of the area of each film that it does not substantially obstruct projection of the image therefrom.

In the construction shown in Figs. 4 and 6 no retaining strip 38 is employed at the upper margin of the film. Hence, the device is adapted to handle films which differ substantially in their relative dimensions. Where the dimensions of the films are dependably uniform a strip 38' may be used along the top of the film in holder 30 to supplement the strip 38 at the bottom, the area of cover glass 36' being correspondingly reduced as shown in Fig. 7. To position a film in this apparatus the film must be centrally bowed in order that its free edges may be introduced into the wedge-shaped pockets 39 of the respective retaining strips 38 and 38', the pockets being sufficiently spaced so that the film may flatten out under pressure of the cover glass 36'.

It is not necessary that the retaining strips be beveled to produce pockets 39. By way of illustration I have shown in Fig. 8 retaining strips 380 made of rubber and cemented to the base glass 35 only along their outer margins, the inner margins being left free to receive the marginal portions of film 33. The cover strip 36' is applied the same as in Fig. 7.

If desired, the same apparatus may be made to receive two rows of films arranged to show the complete sets of teeth of the upper and lower jaws of a patient. In order to provide adequate space, the clearance in the frame guide is increased by making the frame guide of sheet metal as shown at 21 in Figs. 3 and 5. Where this construction is employed, the front and rear plates of the frame guide comprise integral portions thereof, the opening 26 and the shutter 27 apertured at 28 being offset to register only with the films of that set which happen to be uppermost in any given position of the film frame 40.

The film frame 40 corresponds closely to that shown at 30, with the exception that it is sufficiently wide to receive two sets of films. A single base glass 35' may serve for the mounting of the films of both sets. A single retaining strip 38'' is cemented centrally to the glass 35' and has its inner face beveled both at its top and bottom margins, thereby providing upper and lower wedge-shaped pockets for the films of the respective sets. A separate cover glass 36 is employed for each set and is held at its ends by clamping members 37, as previously described. When a film in any given set is to be projected in the use of this apparatus the frame 40 is inverted if necessary, and is so positioned in the frame guide 21 that the particular film from which the image is to be projected will register with opening 26, or such portion thereof as is unobscured by shutter 27.

It will be apparent from the foregoing description that I have provided an arrangement for masking and displaying in their proper relative positions the several films comprising a set of pictures of the teeth, whereby any given tooth or the spaces between teeth may be disclosed by projection of the images from the films of any given set. I have further provided means whereby films can be arranged in sets to be clamped by a single cover glass notwithstanding their tendency to curl individually, and notwithstanding the difficulty of handling a number of films when they evidence this curling tendency.

I claim:

1. A frame for the display of dental films, said frame comprising a mask provided with an opening and a margin substantially rectilinear at one side of said opening and centrally offset at the other side thereof, and film mounting means associated with said mask comprising a marginal clamp associated with the rectilinear margin of the mask and adapted marginally to engage each of the series of films aligned with said margin, and transparent clamping means operative to engage other portions of films marginally held by said clamp.

2. In a device of the character described, the combination with a frame, of a mask carried thereby and having an opening and a margin rectilinear along one side of said opening, a glass applied to said frame to cover said opening, a clamping strip positioned upon said glass and having a free margin in clamping relation to said glass along the rectilinear margin of said mask adjacent said opening, and a cover glass, and means for holding said cover glass to said first mentioned glass to flatten thereon films having their margins engaged beneath the free margin of said strip.

3. In a device of the character described, the combination of a frame having an opening, a supporting glass fitted to said frame and in registry with said opening, a clamping strip co-acting with said cover glass adjacent one margin of said frame along said opening, and a transparent clamping plate co-acting with substantially all portions of said mounting glass in registry with the opening.

4. In a device of the character described, the combination with a frame having an opening, of a mounting glass applied to said frame and substantially covering the opening, a removable clamping glass registering with a major portion of said mounting glass, means for holding said clamping glass in clamping relation to said mounting glass, and a clamping strip co-acting with a minor portion of said mounting glass and marginally provided adjacent said clamping glass with a free margin in relatively non-removable clamping relation to said mounting glass.

5. In a device of the character described, the combination with a projection slide frame and a mounting glass therein having sufficient body to conduct heat from the film in such quantities as to prevent blistering thereof, of a clamping strip secured adjacent said mounting glass and provided with a free margin forming with said mounting glass a wedge-shaped pocket adapted for the frictional retention of the margin of a film placed on said mounting glass, said strip margin being so limited in extent as to leave exposed substantially the entire picture-carrying portion of the film.

6. In a device of the character described, the combination with a film and a mounting glass, of a strip fastened to said mounting glass and having its inner face beveled along a free margin to provide a wedge-shaped pocket adapted for the frictional retention of the edge of the film, said strip having sufficient body to engage separately each of a series of negatives marginally thrust beneath its beveled edge.

7. In a device of the character described, the combination with a frame guide provided with a mask having an offset aperture, of a frame provided with means for mounting two sets of films in rows whereof either is registerable with said aperture by inversion of the frame in said guide.

8. In a device of the character described, a duplex frame comprising a mask having a central opening, a mounting glass applied across said opening, a clamping strip extending centrally across said opening and provided at each of its opposite edges with marginal portions in clamping relation to said mounting guide, and separate clamping plates co-acting with said mounting glass at each side of said clamping strip.

9. In a device of the character described, the combination with a mounting glass plate, of a clamping strip of substantial thickness provided with means holding a portion of its width in face contact with said plate along a line offset from the central portion of the plate, the margin of said strip adjacent said central portion being free of the plate for a predetermined distance just sufficient to receive the extreme edge of a negative, and a means for clamping said negative flat against said plate in heat delivering relation thereto, whereby heat from a projector lamp will be conducted from said negative with sufficient rapidity to avoid destroying the negative.

10. A film holder of the class described having in combination a glass plate, a film arranged to be pressed against the plate, a clamping strip attached to the plate and having a portion thereof coacting with the plate to form a pocket for receiving the margin of the film, and means for maintaining the film flat against the plate.

11. A film holder of the class described having in combination a glass plate, a film arranged to be pressed against the plate, a clamping strip attached to the plate and having a portion thereof coacting with the plate to form a pocket for receiving the margin of the film, and means for maintaining the film flat against the plate, said means being substantially in alignment with said clamping strip.

12. In a film display frame for projectors having a mounting glass plate, a negative arranged to be mounted on said plate, a clamping strip of substantial thickness associated with the plate, means for holding a portion of the clamping strip in contact with the plate, the inner margin of the strip being free of the plate to form a pocket for receiving the negative, and means for clamping the negative against the plate.

13. In a film display frame for projectors having a mounting glass plate, a negative arranged to be mounted on said plate, a clamping strip of substantial thickness associated with the plate, means for holding a portion of the clamping strip in contact with the plate, the inner margin of the strip being free of the plate to form a pocket for receiving the negative, and transparent means for clamping the negative against the plate.

14. In a film display frame for projectors having a mounting glass plate, a series of films arranged to be mounted in fixed position on said plate, a clamping strip of substantial thickness associated with the plate, means for holding a portion of the clamping strip in contact with the plate, the inner margin of the strip being free of the plate to form a pocket for receiving the films, and transparent means for clamping the film against the plate, said transparent means being substantially in vertical alignment with said clamping strip.

15. A film holder for projectors having in combination a glass plate in which a film is adapted to be pressed, and a strip having means continuously connecting it to the plate, said strip having a clamping portion coacting with the plate to form a pocket for receiving the margin of the film so as to retain the same against the plate.

16. A film holder for projectors having in combination a glass plate, a series of films arranged to be pressed against the plate and a strip of substantial body connected to the plate and having a clamping portion coacting with the plate to form a pocket for receiving the margins of the films so as to yieldingly retain them against the plate.

17. A film holder for projectors having in combination a glass plate, a film arranged to be pressed against the plate, said plate having sufficient body to conduct heat from the film in such quantities as to prevent blistering thereof, and a strip connected to the plate and having an inner clamping portion coacting with the plate to form a pocket for receiving the margin of the film so as to retain the same against the plate.

ALDEN HUDSON.